(12) United States Patent
Suwabe

(10) Patent No.: US 10,259,321 B2
(45) Date of Patent: Apr. 16, 2019

(54) VEHICLE CONTROL DEVICE AND METHOD FOR CONTROLLING THE SAME

(71) Applicants: JATCO Ltd, Fuji-shi, Shizuoka (JP); NISSAN MOTOR CO., LTD., Yokohama-shi, Kanagawa (JP)

(72) Inventor: Tomoyuki Suwabe, Atsugi (JP)

(73) Assignees: JATCO LTD, Fuji-Shi (JP); NISSAN MOTOR CO., LTD., Yokohama-Shi (JP)

(*) Notice: Subject to any disclaimer, the term of this patent is extended or adjusted under 35 U.S.C. 154(b) by 207 days.

(21) Appl. No.: 15/510,394

(22) PCT Filed: Jun. 8, 2015

(86) PCT No.: PCT/JP2015/066508
§ 371 (c)(1),
(2) Date: Mar. 10, 2017

(87) PCT Pub. No.: WO2016/042856
PCT Pub. Date: Mar. 24, 2016

(65) Prior Publication Data
US 2017/0253119 A1    Sep. 7, 2017

(30) Foreign Application Priority Data

Sep. 18, 2014 (JP) .................. 2014-189907

(51) Int. Cl.
*B60K 28/16* (2006.01)
*B60W 10/06* (2006.01)
(Continued)

(52) U.S. Cl.
CPC .............. *B60K 28/16* (2013.01); *B60K 23/08* (2013.01); *B60W 10/06* (2013.01);
(Continued)

(58) Field of Classification Search
CPC .......... B60K 6/48; B60K 28/16; B60K 23/08; B60K 6/547; B60W 10/06; B60W 10/107;
(Continued)

(56) References Cited

U.S. PATENT DOCUMENTS

| 4,762,196 A | 8/1988 | Harada et al. |
| 2002/0024255 A1 | 2/2002 | Schmitt et al. |

(Continued)

FOREIGN PATENT DOCUMENTS

| JP | S64-069849 A | 3/1989 |
| JP | H02-241844 A | 9/1990 |

(Continued)

*Primary Examiner* — Behrang Badii
(74) *Attorney, Agent, or Firm* — Foley & Lardner LLP

(57) ABSTRACT

A vehicle control device separately controls driving powers distributed to right and left wheels. The vehicle control device is configured to execute a vehicle posture control for reducing the driving powers transmitted from a driving source to the wheels by a request from a vehicle side. The vehicle control device includes a slip detection unit and a torque control unit. The slip detection unit is configured to detect a slip in the wheels. The torque control unit is configured to determine whether to perform a torque control after an operation of the vehicle posture control according to a detection result of the slip and a state of a transmission. The torque control is a control to control a torque input to the transmission by a request from the transmission side. The torque control unit is configured to execute the torque control on the basis of a determination result.

6 Claims, 5 Drawing Sheets

(51) Int. Cl.
  *B60W 10/107* (2012.01)
  *B60W 30/02* (2012.01)
  *F16H 61/02* (2006.01)
  *F02D 29/02* (2006.01)
  *F16H 61/662* (2006.01)
  *F16H 63/50* (2006.01)
  *B60K 23/08* (2006.01)
  *B60W 30/18* (2012.01)
  *B60W 10/111* (2012.01)
  *B60W 10/184* (2012.01)
  *B60W 50/00* (2006.01)

(52) U.S. Cl.
  CPC ......... *B60W 10/107* (2013.01); *B60W 10/111* (2013.01); *B60W 10/184* (2013.01); *B60W 30/02* (2013.01); *B60W 30/18172* (2013.01); *F02D 29/02* (2013.01); *F16H 61/02* (2013.01); *F16H 61/662* (2013.01); *F16H 63/50* (2013.01); B60W 2050/0094 (2013.01); B60W 2510/1005 (2013.01); B60W 2520/26 (2013.01); B60W 2520/266 (2013.01); B60W 2710/0666 (2013.01); B60W 2710/1022 (2013.01)

(58) Field of Classification Search
  CPC .. B60W 10/111; B60W 10/184; B60W 30/02; B60W 30/18172; B60W 2050/0094; B60W 2510/1005; B60W 2520/26; B60W 2520/266; B60W 2710/0666; B60W 2710/1022; B60W 10/02; B60W 10/04; B60W 20/00; B60W 10/08; B60W 10/115; B60W 30/18118; B60W 10/10; B60W 20/40; B60W 30/18045; F02D 29/02; F02D 31/001; F16H 61/02; F16H 61/662; F16H 63/50; B60L 15/20; B60L 11/14; F16D 48/06
  See application file for complete search history.

(56) References Cited

U.S. PATENT DOCUMENTS

| | | | |
|---|---|---|---|
| 2009/0326769 A1 | 12/2009 | Oshima et al. | |
| 2009/0326777 A1 | 12/2009 | Oshima et al. | |
| 2009/0326779 A1 | 12/2009 | Oshima et al. | |
| 2012/0116637 A1 | 5/2012 | Totsuka | |
| 2013/0289810 A1* | 10/2013 | Holmes | B60K 6/24 701/22 |
| 2014/0018209 A1* | 1/2014 | Dodo | F16D 48/08 477/176 |
| 2014/0045649 A1* | 2/2014 | Yoshida | B60K 6/48 477/5 |
| 2014/0088812 A1* | 3/2014 | Kobayashi | B60K 6/48 701/22 |
| 2014/0207323 A1* | 7/2014 | Yoshida | B60K 6/48 701/22 |
| 2014/0243149 A1* | 8/2014 | Holmes | B60W 20/30 477/5 |
| 2014/0257618 A1* | 9/2014 | Hiasa | B60K 6/48 701/22 |
| 2014/0330469 A1* | 11/2014 | Yoshida | B60W 10/06 701/22 |
| 2015/0006063 A1* | 1/2015 | Takahashi | B60K 6/48 701/110 |

FOREIGN PATENT DOCUMENTS

| | | |
|---|---|---|
| JP | 2000-193081 A | 7/2000 |
| JP | 2004-124968 A | 4/2004 |
| JP | 2010-031846 A | 2/2010 |
| JP | 2010-031850 A | 2/2010 |
| JP | 2011-131634 A | 7/2011 |
| JP | 2013-063722 A | 4/2013 |
| JP | 2013-124749 A | 6/2013 |
| WO | WO-2011/010547 A1 | 1/2011 |

* cited by examiner

VEHICLE CONTROL DEVICE AND METHOD FOR CONTROLLING THE SAME

TECHNICAL FIELD

The present invention relates to a vehicle control device and a method for controlling a vehicle.

BACKGROUND ART

JP2011-131634A discloses the following control device for vehicle. The control device for vehicle includes a sideslip prevention device and a traction control device. The sideslip prevention device can individually control braking forces in wheels. The traction control device reduces an engine torque if the wheel slips. The control device for vehicle controls these sideslip prevention device and traction control device to make a vehicle posture control that stabilizes a vehicle posture executable.

SUMMARY OF INVENTION

There has been known that, in case of a slip of a wheel, a vehicle executes a torque control that reduces an engine torque according to a state of a transmission to protect the transmission.

In a situation where, for example, a large driving power is required for the vehicle that can execute the vehicle posture control and the torque control such as in an uphill road, executing the above-described torque control in addition to the vehicle posture control increases an amount of reduction in driving power of the vehicle. This possibly results in an insufficient driving power required to run the uphill road. Thus, if the torque control is not appropriately executed, the driveability possibly gets worse.

The present invention has been invented to solve the problems. An object of the present invention is to appropriately execute the torque control to protect the transmission, prevent the insufficient driving power, and prevent the deterioration of driveability.

According to an aspect of the present invention, a vehicle control device that separately controls driving powers distributed to right and left wheels, the vehicle control device being configured to execute a vehicle posture control, the vehicle posture control being a control to reduce the driving powers transmitted from a driving source to the wheels by a request from a vehicle side, is provided. The vehicle control device includes a slip detection unit configured to detect a slip in the wheels; and a torque control unit configured to determine whether to perform a torque control, after an operation of the vehicle posture control, according to a detection result of the slip and a state of a transmission, the torque control being a control to control a torque input to the transmission by a request from the transmission side, the torque control unit being configured to execute the torque control on the basis of the determination result.

According to another aspect of the present invention, a method for controlling a vehicle that separately controls driving powers distributed to right and left wheels, the method for controlling the vehicle being configured to execute a vehicle posture control, the vehicle posture control being a control to reduce the driving powers transmitted from a driving source to the wheels by a request from a vehicle side, is provided. The method includes detecting a slip in the wheels; and determining whether to perform a torque control, after an operation of the vehicle posture control, according to a detection result of the slip and a state of a transmission, the torque control being a control to control a torque input to the transmission by a request from the transmission side, and executing the torque control on the basis of the determination result.

With these aspects, in the case where the vehicle posture control is executed, whether to perform the torque control is determined according to the state of slip and the state of the transmission and the torque control is executed according to the determination result. This ensures protecting the transmission, preventing the insufficient driving power, and preventing the deterioration of driveability.

DESCRIPTION OF EMBODIMENTS

The following describes an embodiment of the present invention with reference to the accompanying drawings. It should be noted that, in the following description, a "speed ratio (gear ratio)" of a certain transmission mechanism indicates a value obtained by dividing an input rotation speed of this transmission mechanism by an output rotation speed of this transmission mechanism. The large speed ratio (gear ratio) is referred to as "Low" and the small speed ratio is referred to as "High."

Figure 1:
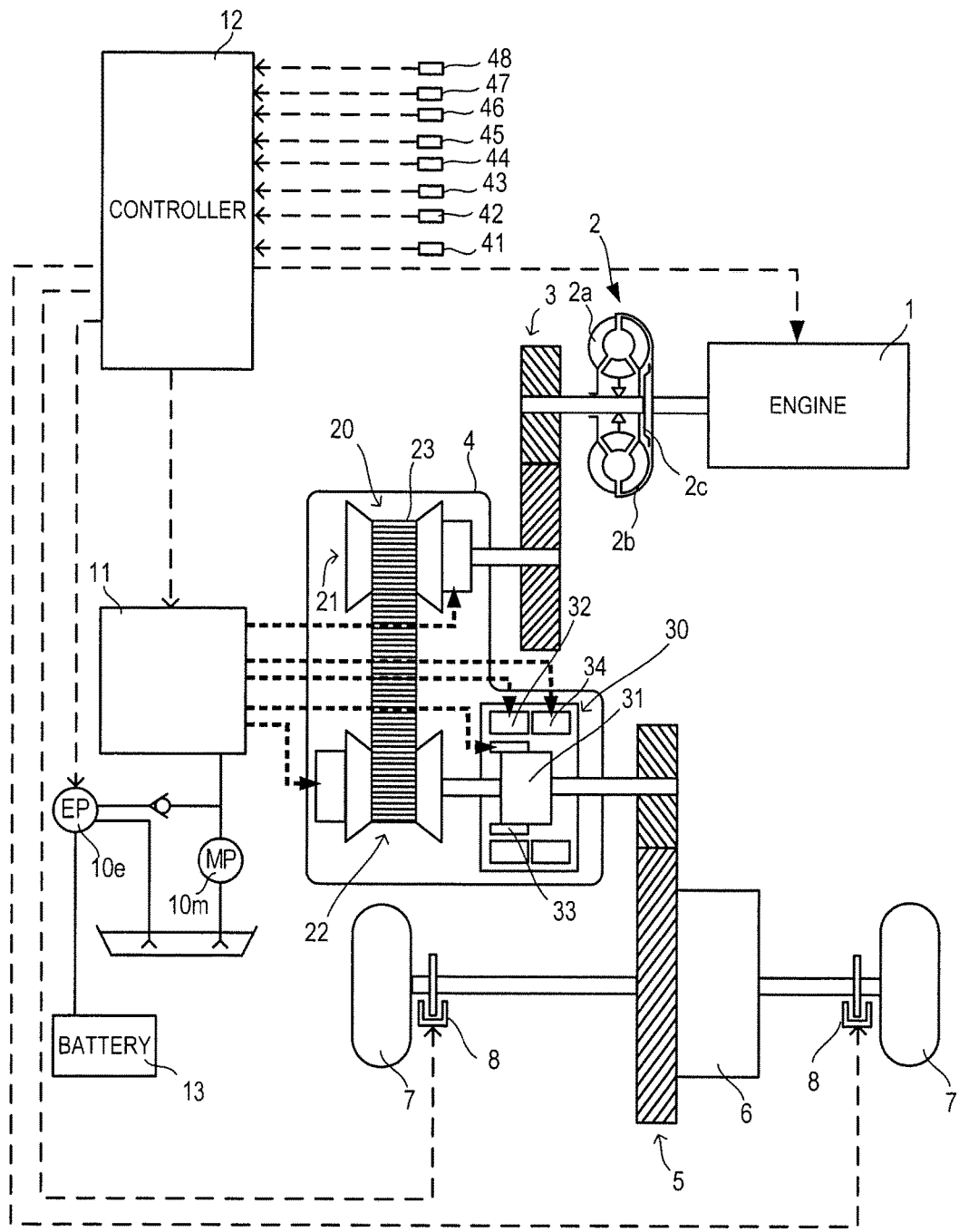
FIG. 1 is a schematic configuration diagram of a vehicle of this embodiment.

FIG. 1 is a schematic configuration diagram of a vehicle according to the embodiment of the present invention. This vehicle includes an engine 1 as a driving source. An output and a rotation of the engine 1 are input to a pump impeller 2a of a torque converter 2 with a lock-up clutch 2c and are transmitted from a turbine runner 2b to wheels 7 via a first gear train 3, a continuously variable transmission (hereinafter simply referred to as a "transmission 4"), a second gear train 5, and an actuator 6.

The transmission 4 includes a mechanical oil pump 10m and an electric oil pump 10e. The rotation of the engine 1 is input to the mechanical oil pump 10m to drive the mechanical oil pump 10m using some of the power from the engine 1. An electric power is supplied from a battery 13 to the electric oil pump 10e to drive the electric oil pump 10e. The transmission 4 includes a hydraulic control circuit 11. The hydraulic control circuit 11 regulates a hydraulic pressure from the mechanical oil pump 10m or the electric oil pump 10e and supplies the hydraulic pressure to respective parts of the transmission 4.

The transmission 4 includes a belt-type continuously variable transmission mechanism (hereinafter referred to as a "variator 20") as a friction transmission mechanism and a sub-transmission mechanism 30 disposed in series to the variator 20. "Disposed in series" means that the variator 20 and the sub-transmission mechanism 30 are disposed in series in a power transmission path from the engine 1 up to the wheels 7. The sub-transmission mechanism 30 may be directly coupled to an output shaft of the variator 20 like this example or may be coupled via another shift or a power transmission mechanism (for example, a gear train). Alternatively, the sub-transmission mechanism 30 may be coupled to a front stage (input shaft side) of the variator 20.

The variator 20 includes a primary pulley 21, a secondary pulley 22, and a V belt 23, which is wrapped around the pulleys 21 and 22. The variator 20 changes widths of V grooves according to a primary pulley pressure Ppri and a secondary pulley pressure Psec. This changes a radius that the V belt 23 is in contact with the respective pulleys 21 and 22, thus steplessly changing a speed ratio of the variator 20.

The variator 20 is a one-side-pressure-regulating transmission where a line pressure PL is set on the basis of the secondary pulley pressure Psec and reducing and regulating the line pressure PL generates the primary pulley pressure Ppri.

The sub-transmission mechanism 30 is a transmission mechanism having two stages for forward and one stage for backward. The sub-transmission mechanism 30 includes a Ravigneaux type planetary gear mechanism 31 and a plurality of friction engaging elements (a Low brake 32, a High clutch 33, and a Rev brake 34). The Ravigneaux type planetary gear mechanism 31 couples carriers of two planetary gears. The friction engaging elements are coupled to a plurality of rotating elements constituting the Ravigneaux type planetary gear mechanism 31 to change a linking state of these elements. Adjusting the hydraulic pressure supplied to the respective friction engaging elements 32 to 34 to change an engaging or a disengage state of the respective friction engaging elements 32 to 34 changes a gear position of the sub-transmission mechanism 30.

Engaging the Low brake 32 and disengaging the High clutch 33 and the Rev brake 34 sets the gear position of the sub-transmission mechanism 30 to a first speed (first gear position). Engaging the High clutch 33 and disengaging the Low brake 32 and the Rev brake 34 sets the gear position of the sub-transmission mechanism 30 to a second speed (second gear position). Engaging the Rev brake 34 and disengaging the Low brake 32 and the High clutch 33 makes the gear position of the sub-transmission mechanism 30 a backward.

The wheels 7 each include braking devices 8. The braking devices 8 each can individually control the braking forces regardless of a manipulated variable of a brake pedal by a driver.

Figure 2:
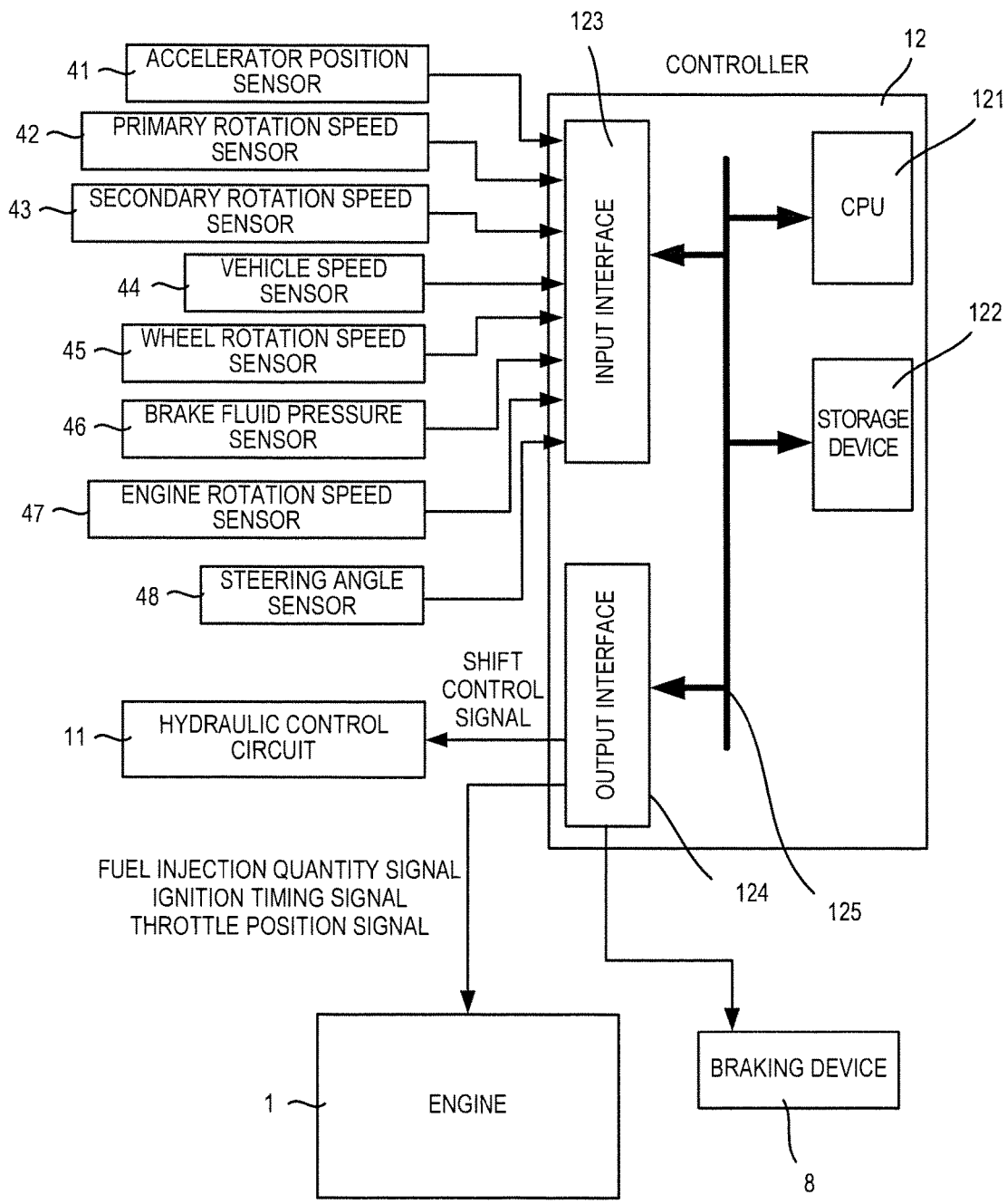
FIG. 2 is a schematic configuration diagram of a controller of this embodiment.

A controller 12 is a controller that integrally controls the engine 1, the transmission 4, and a similar part. As illustrated in FIG. 2, the controller 12 includes a CPU 121, a storage device 122 constituted of a RAM and a ROM, an input interface 123, an output interface 124, and a bus 125, which couples these parts to one another. It should be noted that, the controller 12 may be constituted of a plurality of controllers.

To the input interface 123, an output signal from an accelerator position sensor 41, which detects an accelerator position APO as a manipulated variable of an accelerator pedal, an output signal from a primary rotation speed sensor 42, which detects a primary rotation speed Npri of the primary pulley 21, an output signal from a secondary rotation speed sensor 43, which detects a secondary rotation speed Nsec of the secondary pulley 22, an output signal from a vehicle speed sensor 44, which detects a vehicle speed VSP, an output signal from a wheel rotation speed sensors 45, which are disposed at the respective wheels 7 to detect a rotation speed Nf of the wheels 7, signals from a brake fluid pressure sensor 46, which detects a brake fluid pressure, and an engine rotation speed sensor 47, which detects an engine rotation speed Ne, an output signal from a steering angle sensor 48, which detects a manipulated variable θ of a steering, and a similar signal are input.

The storage device 122 stores a control program for the engine 1, a shift control program for the transmission 4, and various maps and tables used for these programs. The CPU 121 reads and runs the programs stored in the storage device 122, executes various operation processes on various signals input through the input interface 123, creates a fuel injection quantity signal, an ignition timing signal, a throttle position signal, a shift control signal (torque instruction signal), and a braking force signal and outputs the created signals to the engine 1, the hydraulic control circuit 11, and the braking devices 8 through the output interface 124. The storage device 122 appropriately stores various values used for the operation processes by the CPU 121 and the results of the operation.

The hydraulic control circuit 11 is constituted of a plurality of flow passages and a plurality of hydraulic control valves. The hydraulic control circuit 11 controls the plurality of hydraulic control valves to switch a supply passage for hydraulic pressure on the basis of the shift control signal from the controller 12. Additionally, the hydraulic control circuit 11 prepares required hydraulic pressure from the hydraulic pressure generated in the mechanical oil pump 10m or the electric oil pump 10e and supplies this hydraulic pressure to the respective parts of the transmission 4. This changes the speed ratio of the variator 20 and the gear position of the sub-transmission mechanism 30, shifting the transmission 4.

Figure 3:
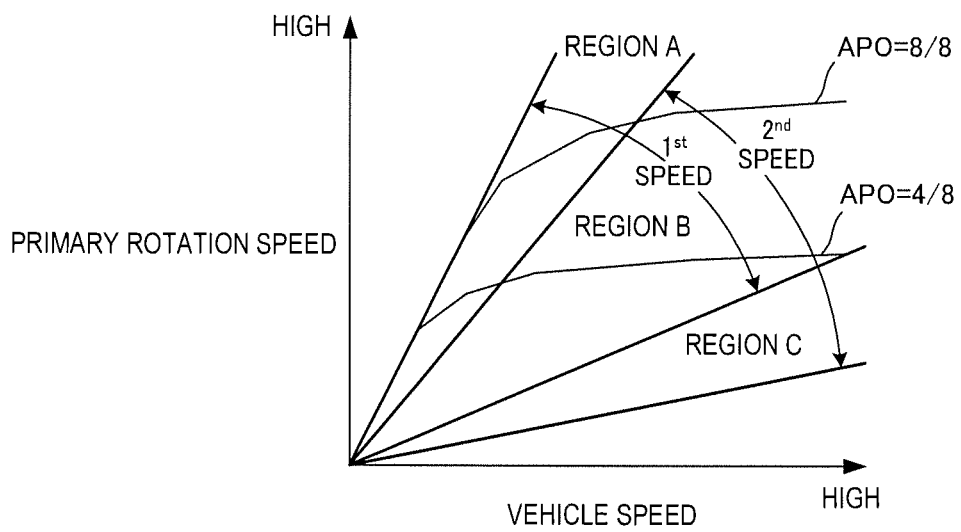
FIG. 3 is an example of a shift map stored in a storage device.

FIG. 3 illustrates an example of the shift map stored in the storage device 122. The controller 12 controls the variator 20 and the sub-transmission mechanism 30 according to a driving state of the vehicle (in this embodiment, the vehicle speed VSP, the primary rotation speed Npri, the accelerator position APO, and a similar state) on the basis of this shift map. For explanation, FIG. 3 illustrates the two accelerator positions APO (APO=4/8, 8/8).

This shift map defines operating points of the transmission 4 by the vehicle speed VSP and the primary rotation speed Npri. An inclination of a line connecting the operating points of the transmission 4 and a zero point, which is at the lower-left corner in the shift map, corresponds to the speed ratio of the transmission 4 (the entire speed ratio obtained by multiplying the speed ratio of the variator 20 by the speed ratio of the sub-transmission mechanism 30, hereinafter referred to as a "through-speed ratio it").

With the transmission 4, shift regions (a region A and a region B in FIG. 3) achievable with the sub-transmission mechanism 30 at the first speed partially (the region B) overlaps with the shift regions (the region B and a region C in FIG. 3) achievable with the sub-transmission mechanism 30 at the second speed. That is, as the shift region, a shared shift region achievable by the sub-transmission mechanism 30 at both the first speed and the second speed is configured. The transmission 4 can achieve the through-speed ratio it in the region B by engaging any of the Low brake 32 and the High clutch 33 of the sub-transmission mechanism 30.

The controller 12 controls the braking forces by the respective braking devices 8 not by the brake pedal operation by the driver to separately control the driving powers distributed to the right and left wheels 7. Thus, the controller 12 can execute a vehicle posture control (hereinafter referred to as a Vehicle Dynamics Control (VDC). The VDC has a slip prevention function, which prevents a sideslip and a fishtail of the vehicle, and a traction control function, which reduces an engine torque Te transmitted to the wheels 7.

The controller 12 can execute a torque down control similar to the traction control function according to the slip generation state in the wheels 7 and the operation state of the transmission 4, for example, the gear position of the sub-transmission mechanism 30. That is, the controller 12 can reduce the engine torque Te according to the slip generation state and the state of the transmission 4 separately from the vehicle posture control.

Figure 4:
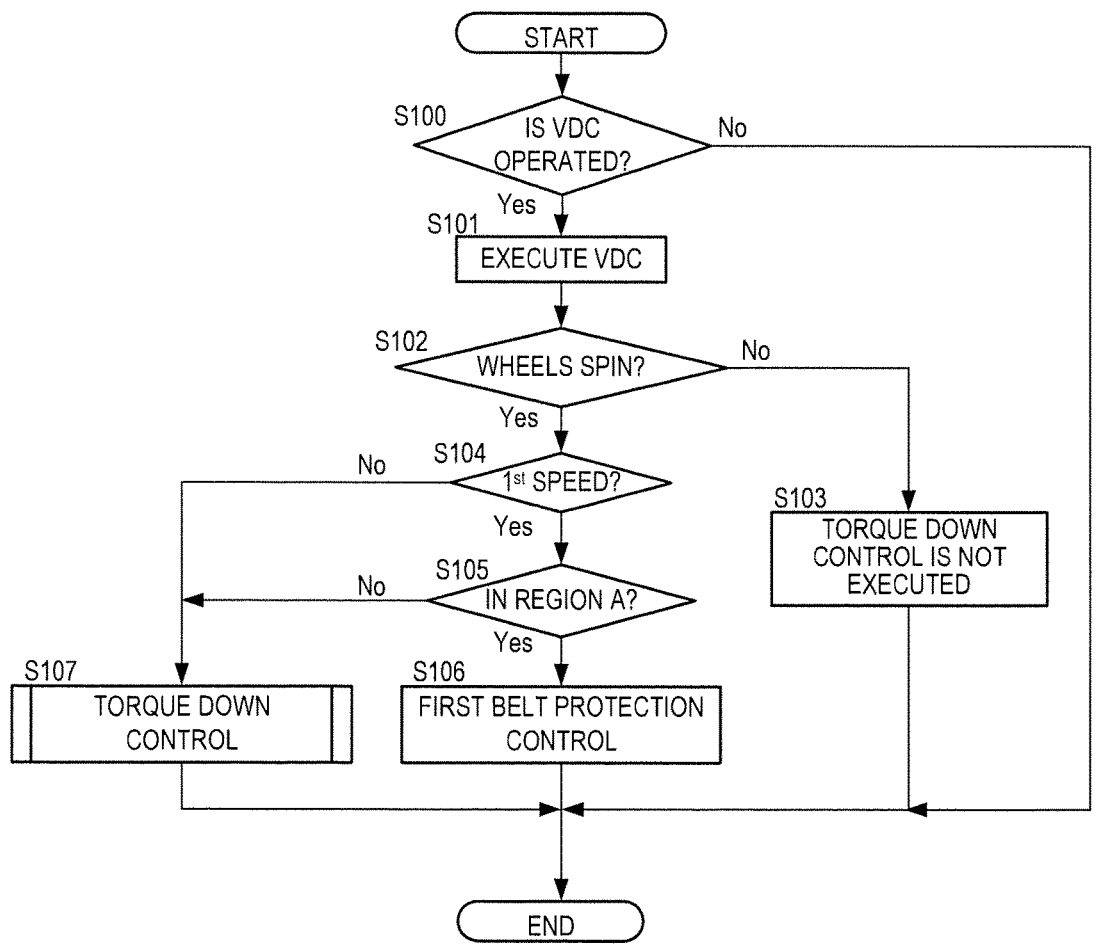
FIG. 4 is a flowchart showing a content of a main routine for a torque down control of this embodiment.

The following describes the torque down control of this embodiment with reference to the flowchart in FIG. 4.

At Step S100, the controller 12 determines whether the VDC is operated. When the VDC is operated, the process proceeds to Step S101. When the VDC does not operate, this process is terminated.

At Step S101, the controller 12 executes the VDC to control the braking forces by the respective braking devices 8 and to reduce the engine torque Te.

At Step S102, the controller 12 determines whether the wheels 7 slip, that is, whether a wheel spin occurs in spite of the execution of the VDC. On the basis of the signals from the wheel rotation speed sensors 45, which are disposed at the respective wheels 7, the controller 12 determines that the wheel spin occurs when a rotation speed difference between the front and the rear wheels is a predetermined speed difference or more. The predetermined speed difference is a preset value. If the wheel spin occurs, the process proceeds to Step S104. When the wheel spin does not occur, the process proceeds to Step S103.

At Step S103, the controller 12 does not execute the torque down control. Since the VDC is executed and the wheel spin does not occur, the controller 12 executes the control such that the engine torque Te does not decrease more than necessary.

At Step S104, the controller 12 determines whether the current gear position of the sub-transmission mechanism 30 is at the first speed. When the current gear position of the sub-transmission mechanism 30 is at the first speed, the process proceeds to Step S105. When the current gear position of the sub-transmission mechanism 30 is at the second speed, the process proceeds to Step S107.

At Step S105, the controller 12 determines whether the through-speed ratio it is in the region A. When the through-speed ratio it is in the region A, the process proceeds to Step S106. When the through-speed ratio it in the region B, the process proceeds to Step S107.

At Step S106, the controller 12 executes a first belt protection control. The first belt protection control increases the line pressure PL and executes a first torque down. The first belt protection control increases the line pressure PL such that the secondary pulley pressure Psec of the variator 20 becomes endurance hydraulic pressure of the V belt 23 to increase a belt capacity of the variator 20 larger than a torque capacity of the Low brake 32. Therefore, in the case where a grip force of the wheels 7 increases and the torque input from the wheels 7 side increases, the slip of the Low brake 32 causes the Low brake 32 to function as a fuse, thus ensuring the reduction in belt slip in the variator 20. Further, the first belt protection control calculates an amount of reduction of the engine torque Te and reduces the engine torque Te on the basis of the amount of reduction so as not to generate the belt slip in the variator 20. Reducing the engine torque Te can reduce the belt slip in the variator 20. This allows preventing the belt slip in the variator 20.

At Step S107, the controller 12 executes the torque down control.

Figure 5:
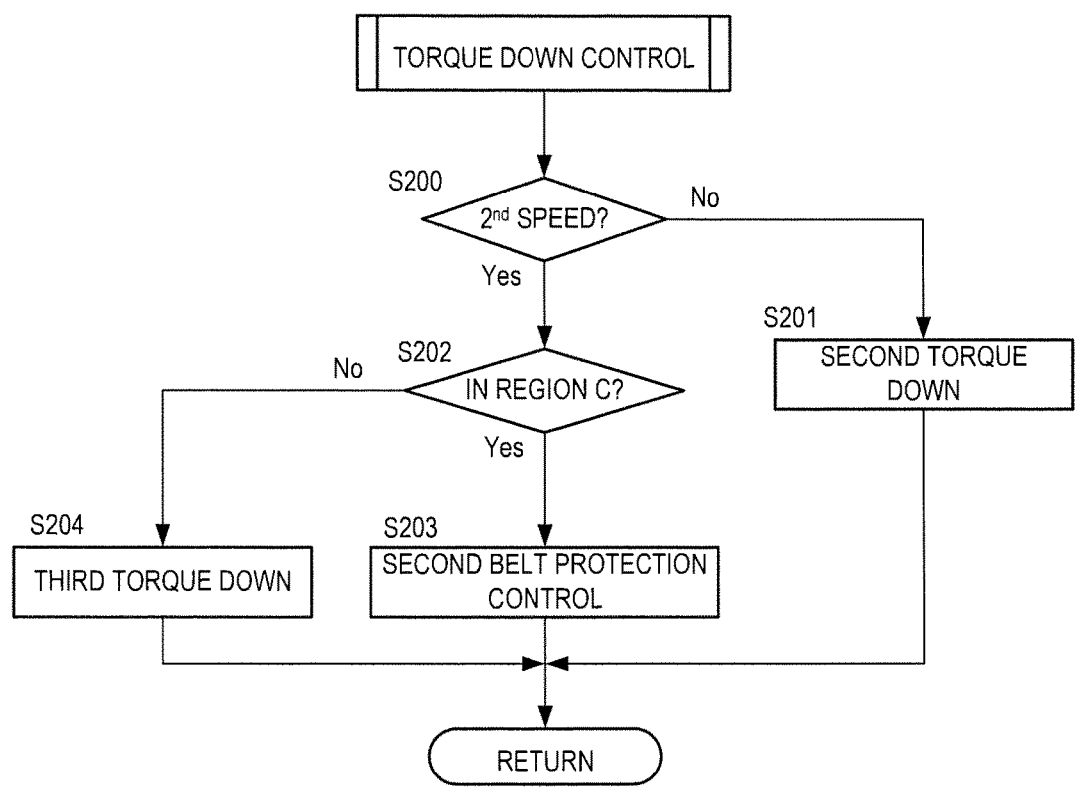
FIG. 5 is a flowchart showing a content of a subroutine for the torque down control of this embodiment.

The following describes the torque down control with reference to the flowchart in FIG. 5.

At Step S200, the controller 12 determines whether the current gear position of the sub-transmission mechanism 30 is at the second speed. When the current gear position of the sub-transmission mechanism 30 is at the second speed, the process proceeds to Step S202. When the current gear position of the sub-transmission mechanism 30 is at the first speed (when the gear position is at the first speed and the through-speed ratio it is in the region B), the process proceeds to Step S201.

At Step S201, the controller 12 executes a second torque down. The second torque down reduces the engine torque Te to prevent an over-rev of the engine rotation speed Ne.

At Step S202, the controller 12 determines whether the through-speed ratio it is in the region C. When the through-speed ratio it is in the region C, the process proceeds to Step S203. When through-speed ratio it is in the region B (when the gear position is at the second speed and the through-speed ratio it is in the region B), the process proceeds to Step S204.

At Step S203, the controller 12 executes a second belt protection control. The second belt protection control reduces the hydraulic pressure of the High clutch 33 and reduces a clutch capacity. Therefore, in the case where the grip force of the wheels 7 increases and the torque input from the wheels 7 side increases, the slip of the High clutch 33 causes the High clutch 33 to function as the fuse, thus ensuring preventing the belt slip in the variator 20. Since the input torque from the engine 1 to the variator 20 is small, the second belt protection control does not reduce the engine torque Te.

At Step S204, the controller 12 executes a third torque down. The third torque down reduces the engine torque Te to reduce an amount of heat generation of the High clutch 33 in the case where the High clutch 33 functions as the fuse.

The following describes effects of the embodiment of the present invention.

After the operation of the VDC, whether the torque down control is executed is determined according to the generation state of the wheel spin in the wheels 7 and the state of the transmission 4 and executes the torque down control on the basis of the determination result. This prevents the deterioration of the transmission 4 due to the belt slip in the variator 20, the increase in the amount of heat generation of the sub-transmission mechanism 30, and a similar cause. Additionally, this prevents the reduction in the engine torque Te more than necessary, ensuring preventing the deterioration of driveability.

In the case where the wheel spin does not occur after the operation of the VDC, the torque down control is not executed. This prevents the reduction in the engine torque Te more than necessary, thereby ensuring preventing the deterioration of driveability.

In the case where the wheel spin occurs and the through-speed ratio it is in the region B after the operation of the VDC, the torque down control reduces the engine torque Te. This reduces the torque input from the engine 1 side to the transmission 4, thereby ensuring preventing the deterioration of the transmission 4.

In the case where the wheel spin occurs and the through-speed ratio it is in the region A after the operation of the VDC, the belt capacity is increased and the engine torque Te is reduced. This ensures preventing the belt slip in the variator 20.

In the case where the wheel spin occurs and the through-speed ratio it is in the region C after the operation of the VDC, the clutch capacity is reduced. This ensures preventing the belt slip in the variator 20.

The embodiment of the present invention described above merely describes some application examples of the present invention and not of the nature to limit the technical scope of the present invention to the specific constructions of the above embodiment.

The present application claims a priority of Japanese Patent Application No. 2014-189907 filed with the Japan Patent Office on Sep. 18, 2014, all the contents of which are hereby incorporated by reference.

The invention claimed is:

1. A vehicle control device for a vehicle that separately controls driving powers distributed to right and left wheels of the vehicle, the vehicle having a transmission in which a continuously variable transmission mechanism as a friction transmission mechanism and a mechanism which engages or releases a friction engagement element are provided in series, the vehicle control device being configured to execute a vehicle posture control, the vehicle posture control being a control to reduce the driving powers transmitted from a driving source to the wheels by a request from a vehicle side, the vehicle control device comprising:
   a slip detection unit configured to detect a slip in the wheels;
   a transmission control unit configured to, when the slip in the wheels is detected by the slip detection unit while the vehicle posture control is in process, control the transmission in a manner that a torque capacity of the friction engagement element becomes smaller than a torque capacity of the continuously variable transmission mechanism; and
   a torque control unit configured to perform a torque decrease control which decreases a torque of the driving source when the transmission is controlled by the transmission control unit in the manner that the torque capacity of the friction engagement element becomes smaller than the torque capacity of the continuously variable transmission mechanism.

2. The vehicle control device according to claim 1, wherein
   the torque control unit is configured to perform the torque decrease control when a speed ratio of the transmission is within a predetermined Low speed ratio range.

3. The vehicle control device according to claim 2, wherein
   the torque control unit is configured not to perform the torque decrease control when the speed ratio of the transmission is within a predetermined High speed ratio range.

4. The vehicle control device according to claim 3, further comprising:
   a second torque control unit configure to, when the slip in the wheels is detected by the slip detection unit while the vehicle posture control is in process and when the speed ratio of the transmission is in a speed ratio range between the predetermined Low speed ratio range and the predetermined High speed ratio range, decrease the torque of the driving source.

5. A vehicle control method for a vehicle that separately controls driving powers distributed to right and left wheels of the vehicle, the vehicle having a transmission in which a continuously variable transmission mechanism as a friction transmission mechanism and a mechanism which engages or releases a friction engagement element are provided in series, the vehicle control device being configured to execute a vehicle posture control, the vehicle posture control being a control to reduce the driving powers transmitted from a driving source to the wheels by a request from a vehicle side, the vehicle control method comprising:
   detecting a slip in the wheels;
   when the slip in the wheels is detected while the vehicle posture control is in process, controlling the transmission in a manner that a torque capacity of the friction engagement element becomes smaller than a torque capacity of the continuously variable transmission mechanism; and
   performing a torque decrease control which decreases a torque of the driving source when the transmission is controlled in the manner that the torque capacity of the friction engagement element becomes smaller than the torque capacity of the continuously variable transmission mechanism.

6. A vehicle control device for a vehicle that separately controls driving powers distributed to right and left wheels of the vehicle, the vehicle having a transmission in which a continuously variable transmission mechanism as a friction transmission mechanism and a mechanism which engages or releases a friction engagement element are provided in series, the vehicle control device being configured to execute a vehicle posture control, the vehicle posture control being a control to reduce the driving powers transmitted from a driving source to the wheels by a request from a vehicle side, the vehicle control device comprising:
   slip detection means for detecting a slip in the wheels;
   transmission control means for, when the slip in the wheels is detected by the slip detection means while the vehicle posture control is in process, controlling the transmission in a manner that a torque capacity of the friction engagement element becomes smaller than a torque capacity of the continuously variable transmission mechanism; and
   torque control means for performing a torque decrease control which decreases a torque of the driving source when the transmission is controlled in the manner that the torque capacity of the friction engagement element becomes smaller than the torque capacity of the continuously variable transmission mechanism.

* * * * *